Aug. 13, 1957 W. KRAUSS 2,802,698
MATERIAL FEED REGULATOR
Filed April 24, 1956 2 Sheets-Sheet 1
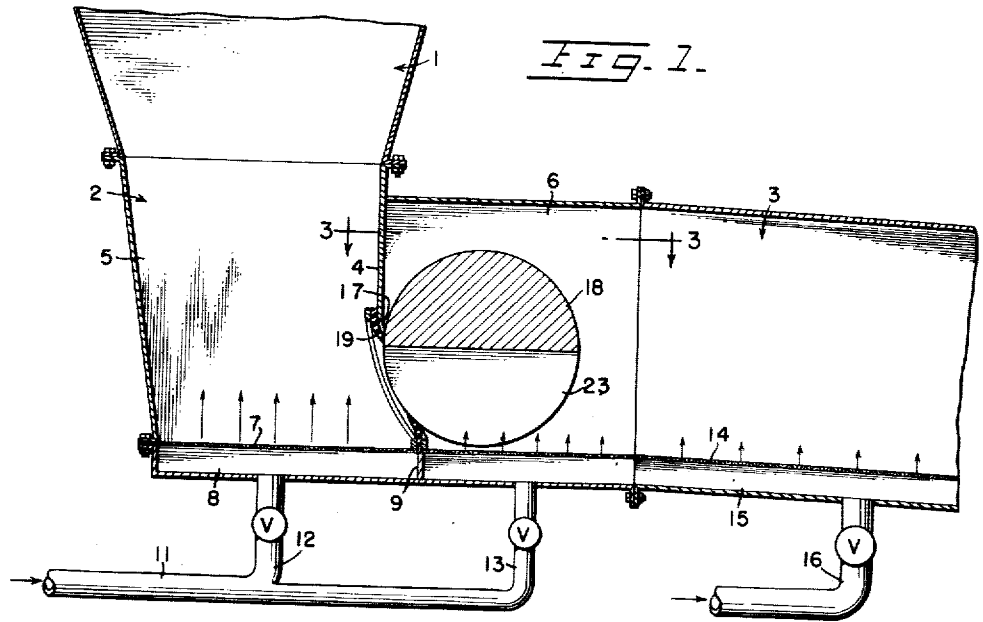
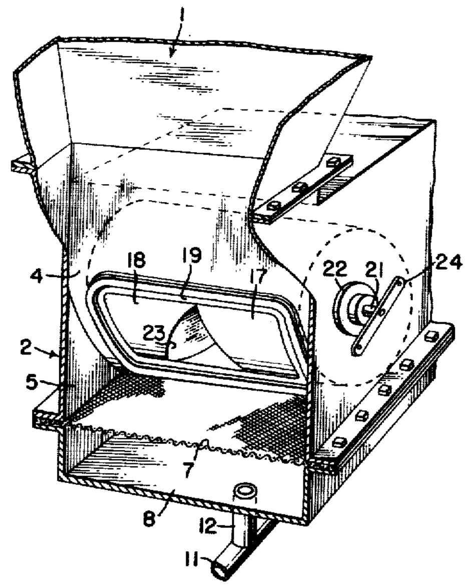
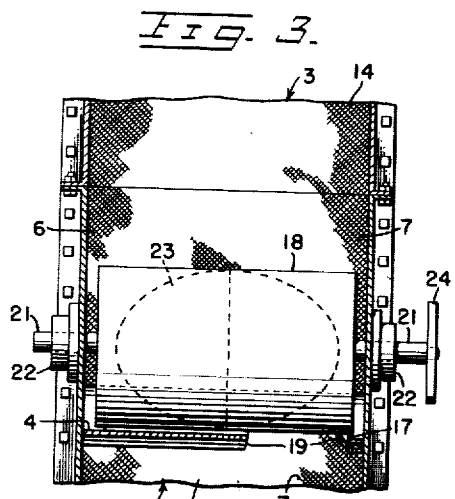
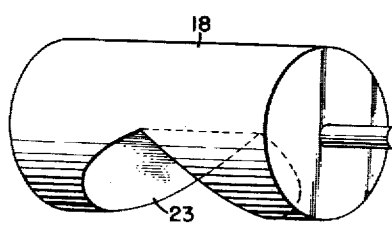
INVENTOR.
WERNER KRAUSS
BY Pennie Edmonds
Morton Barrows & Taylor
ATTORNEY Aug. 13, 1957 W. KRAUSS 2,802,698
MATERIAL FEED REGULATOR
Filed April 24, 1956 2 Sheets-Sheet 2
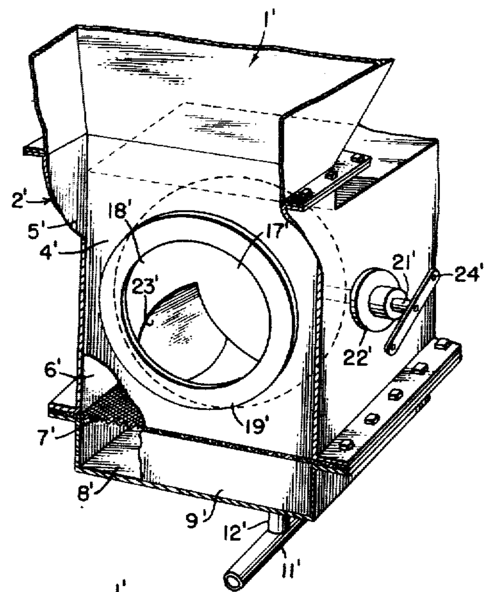
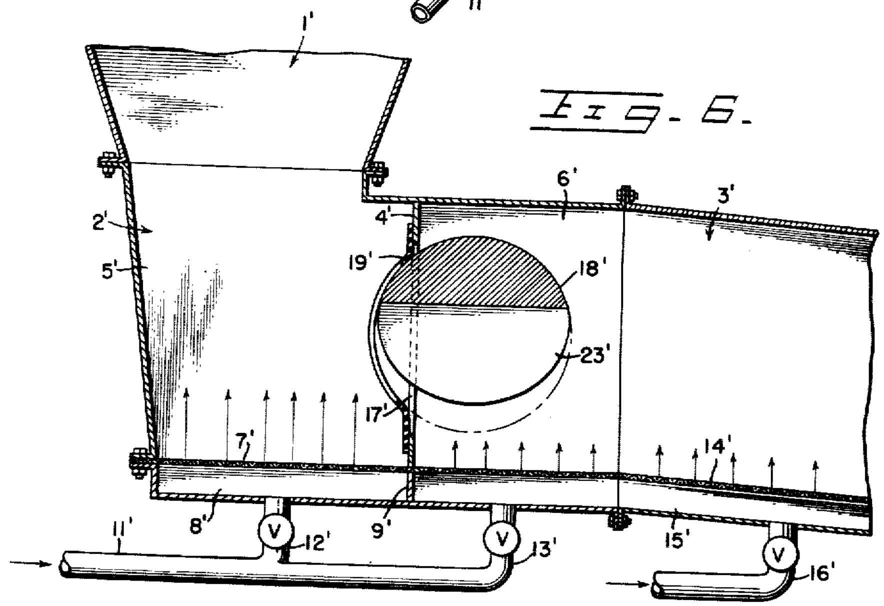
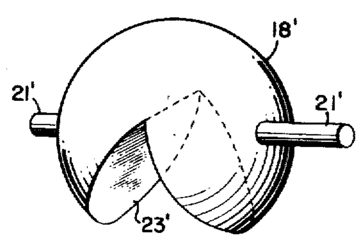
FIG. 7.
INVENTOR
WERNER KRAUSS
BY Pennie Edmonds Morton Barrows & Taylor
ATTORNEYS United States Patent Office 2,802,698

Patented Aug. 13, 1957

2,802,698

MATERIAL FEED REGULATOR

Werner Krauss, Hamburg, Germany, assignor to Fuller Company, Catasauqua, Pa., a corporation of Pennsylvania Application April 24, 1956, Serial No. 580,292

6 Claims. (Cl. 302—29)

This invention relates to the handling of pulverulent and particulate dry solid materials such as cement, cement raw material, pulverized coal, lime, soda ash, powdered catalysts, fertilizers, flours, and such materials which become fluidized upon proper administration of gases. More particularly, it is concerned with the regulation of the flow of such materials from containers where it is desired that the rate of discharge be accurately controlled as well as adjustable and regulatable within wide limits.

The advantages of the art of fluidization have become well known, but there are attendant problems which have been difficult to overcome. One of the most important of these problems is that of controlling and accurately regulating the flow of materials from fluidizing bins since fluidized materials tend to be wild or violent in their flow when drawn from large bins. This is particularly so when bridged-over materials in the bin suddenly fall causing eddies within the fluidized material which transmit fluctuating forces to the outgoing fluidized material at the discharge opening.

Frequently the variation in flow, resulting from the subjection of the fluidized material to fluctuating forces, coupled with any non-aerated bottom areas of the withdrawal means, will produce a momentary partial, or almost complete, de-aeration of a quantity of material within or about the withdrawal means. This de-aeration will destroy the liquid-like properties of the pulverulent material and thereby effect a momentary plugging or partial plugging of the withdrawal means. Such plugging may be so severe that it becomes necessary to mechanically remove the plugging material before the fluidized condition of the pulverulent material may be restored. This interruption and resulting fluctuation of the flow of material prevents the accurate metering or regulation of the flow and makes it difficult to adapt such an installation to batch or measured-quantity systems.

Past attempts at solving the problem of uniformity of flow of the fluidized material have included both pneumatic and purely mechanical means. The pneumatic forms generally have comprised either units which effect a flow stoppage by complete de-aeration and subsequent flow by aeration, or the use of well-known jet eductors or ejectors. These have been effective, to varying degrees, in alleviating the problem but are limited in range of accurate delivery, as well as being complex in their control and susceptible to serious changes in delivery rate upon minor changes in conditions.

Mechanical types of control have been, in general, of the ordinary liquids-type valve, using metal-to-metal gates or the like. These again are effective in varying degrees in overcoming the problem, but again are limited in their range of delivery rate. Furthermore, the abrasive nature of most fluidized solids will erode close-fitting metal parts and reduce their effective life. This type of valve has been effective for installation requiring low delivery rates, but when of a size to permit delivery at high rates, has proved too heavy and space consuming to be convenient. Also, both the pneumatic means and the mechanical valves heretofore used have required substantial space and headroom between the bin and the fluidized gravity conveyor, and since the slope of gravity conveyors usually is critical in its minimum value, space and headroom are at a premium in the design and installation of these systems.

In accordance with this invention the means for controlling the flow of the fluidized pulverulent material from bins includes a rotary valve body located at the front of the discharge outlet of the bin and having a passageway extending therethrough, and preferably a generally sector-shaped passageway extending inwardly from the periphery. This valve body rotates against a flexible member having an opening therethrough with which the passageway in the valve body is alignable. The portion of the flexible member surrounding the orifice engages the valve rotor body so that the flexible member functions both as a weir and as a pressure-compensating, sealing gasket, the whole preferably being contained within a normal-length section or a short, special station of a fluidized gravity conveyor which is connected to the bin discharge and receives the pulervulent material therefrom. The presence of the gas-permeable fluidizing surface throughout the bottom of the valve-unit section insures against plugging of the valve or the valve section by de-aeration, and the extremely smallness of the area of non-aerated surface at the flexible seal insures against preliminary de-aeration.

The passageway through the valve rotor body may be designed for linear values of delivery with respect to rotation, or it may be designed for maximum control at either high or low ranges by selectively increasing or decreasing the angle of divergence of the passageways through valve rotor body with respect to the flexible member, thereby increasing or decreasing the value of the change in passageway area per unit or per degree of rotation of the valve. The passageway through the valve rotor body contemplated by the present invention is such as to give a uniform flow of the fluidized material throughout a wide range of delivery.

This invention, by containing the valve means within the normal dimensions and elevation of the fluidized gravity conveyor, conserves space and headroom below the bin and thus is in no way detrimental to the slope of the conveyor, nor does it present any problem as far as the layout of the system is concerned.

The invention will be further described in connection with the accompanying drawings, but it is to be understood that such further disclosure and description is by way of exemplification and the invention is not to be considered limited thereto other than to the extent set forth in the appended claims.

In the drawings:

Fig. 1 is a sectional view of the discharge portion of a bin with the flow control valve of the present invention associated therewith;

Fig. 2 is a perspective view, partly in section, further showing the flow-control valve and the manner in which it is positioned with respect to the discharge of the bin;

Fig. 3 is a horizontal sectional view on line 3—3 of Fig. 1;

Fig. 4 is a perspective view of the valve rotor body;

Fig. 5 is a view similar to Fig. 2, showing the use of a rotary spherical valve for controlling the flow of the fluidized material from the bin;

Fig. 6 is a horizontal sectional view generally similar to Fig. 1 but showing the rotary spherical valve of Fig. 5; and Fig. 7 is a perspective view of the rotary spherical valve body of Figs. 5 and 6.

Referring now to the drawings and first to the form of the invention illustrated in Figs. 1 to 4, the reference character 1 designates the discharge outlet from a bin or other container for the storage and discharge of fluidizable pulverulent material. The lower end of the discharge outlet is open and is provided with a flange to which a corresponding flange of a combined feeder and valve-control unit 2 may be bolted or otherwise secured. The other end of the unit 2 is connected by similar flanges to a conveyor unit 3 for transport of the material to the desired place. The function of the combined feeder and valve control unit is to receive material from the discharge outlet of the bin and to feed it along to the conveyor 3 at a uniform, accurately-controlled rate.

The feeder and valve-control unit is divided by a partition 4 into a fluidizing and feeding section 5 and a valve-control or valve-regulating section 6. The bottom of the unit 2 is formed of a gas-permeable member 7 beneath which is positioned a plenum chamber 8. As shown in the drawings, the plenum chamber 8 is divided into two sections by a partition 9, with one section underlying the feeding section 5 and the other underlying the valve-control section 6. Air is supplied through the manifold 11 and valve-controlled branch pipes 12 and 13 to the respective compartments of the plenum chamber. However, if desired, the partition 9 and one of the branch pipes 12 or 13 might be omitted and the remaining branch pipe left to supply the necessary air to the entire plenum chamber.

The conveyor 3 preferably is of the fluidized or air-activated gravity type and comprises a gas-permeable medium 14 over which the pulverulent material is adapted to flow and a plenum chamber 15 corresponding to the plenum chamber 8 of the unit 2. Air is introduced into the plenum chamber 15 through the valve-controlled air pipe 16. The conveyor 3 is a well-known type and is more fully described and disclosed in Schemm Patent No. 2,527,455. The gas-permeable medium and the plenum chamber of the combined feeder and valve-control unit 2 are the same as the corresponding elements of the conveyor 3. As far as their operation is concerned, it is sufficient to state here that air at relatively low pressure is introduced into the plenum chambers and passes upwardly in a fine state of sub-division through the gas-permeable members 7 and 14 into the overlying pulverulent material. This aeration of the pulverulent material fluidizes it and causes it to take on the properties of a liquid so that it will flow along the upper surface of the gas-permeable member. As the pulverulent material overlying the feeder section 5 becomes fluidized the head of the overlying material in the bin causes the fluidized material to flow out of the section 5 through an opening 17 in the partition 14 and into the valve-control section 6 from which it passes, under the control of a rotary valve 18, into the conveyor 3.

The lower portion of the partition 14 is curved away from the feeder section 5 towards the valve control section 6 on an arc generally corresponding to the periphery of a cylindrical rotary control valve 18.

The opening 17 in the partition 14 extends transversely substantially the full width of the combined feeder and valve-control unit 2 and is of substantial width. A sealing gasket 19 of rubber or other similar resilient elastic material is secured in an appropriate manner to the side of the partition 4 facing the feeder section 2 and extends completely around the periphery of the opening 17. The gasket has an opening of the same general shape as the opening in the partition 4 but of smaller width and length so that the gasket extends beyond the edges of the partition defining the opening. As shown in Fig. 1, the gasket is distorted so that the edge thereof defining the opening extends through the opening in the partition to be engaged by the periphery of the rotary valve 18.

The valve 18 is provided at each end with a stub shaft 21. The stub shafts are mounted in suitable bearings 22 secured to the side walls of the valve-control section 6. The bearings 22 are so positioned that the periphery of the valve 18 is caused to bear against the edges of the sealing gasket 19 which extend through the opening 17 in the partition 4, so that it will maintain a sliding contact therewith.

The sliding contact of the valve rotor body against the resilient gasket 19 provides little frictional resistance to operation of the valve, yet the resilient member is free to deflect and pass any particles which may become trapped between it and the valve body, thereby preventing any such particles from grinding on and possibly marring the valve rotor face. The superatmospheric pressure in the feeder compartment 13 resulting from the introduction of air thereinto through the gas-permeable medium 17, together with the pressure which the fluidized pulverulent material exerts against the sealing gasket is sufficient to insure that a tight seal is maintained at all times between the sealing gasket and the valve rotor body.

The valve rotor body is provided with an opening 23, here shown as being of sector shape and extending inwardly from the periphery of the valve rotor body. The opening 23 forms a passageway through which the fluidized pulverulent material in the feeder section 5 may flow into the valve control section 6 and thence into the conveyor 3.

The exact shape of the opening or passageway 23 through the valve rotor body or the dimensions thereof is not important as far as the invention is concerned, but it is preferred to provide an opening through the valve having defining side walls which converge in a manner similar to that shown in the drawing.

One of the stub shafts 21 of the valve rotor body extends through its corresponding bearing and has a handle 24 secured thereto. This handle may be rotated manually or it may be connected to suitable mechanism for remote operation. By rotation of the handle, the valve body 18 may be rotated to relatively adjust the angular position of the passageway 23 with respect to the partition 4 and the opening therethrough.

In the drawings the valve body is shown with the passageway therein extending horizontally. In this position maximum flow of the fluidized pulverulent material through the passageway 23 may be obtained. When it is desired to cut down or regulate the flow to provide for the passage of the fluidized material from the feeder section at a lesser rate, the valve body is turned either in a clockwise or anticlockwise direction so that the passageway 23 which extends through the valve rotor body is positioned at a different angle with respect to the partition 4 and the opening therethrough. This causes the effective cross-sectional area of the passage 23 for the flow of fluidized material to be lessened so that the rate of flow of the fluidized material through the passageway is reduced. In other words, rotation of the valve body in the manner just described causes what might be characterized as a closing of the valve against the passage of material from the feeder section 5.

When pulverulent material is stored in the bin or container and is not being withdrawn therefrom, the valve rotor body 18 will be turned to a position in which no portion of the passageway 23 is aligned with the opening in the gasket. In such position, the solid portion of the valve body will lie completely across the opening in the sealing gasket and no material may flow from the feeder compartment 5 into and through the valve-controlled section 6 into the conveyor 3. In other words, the valve may be considered as being in a closed position. When it is desired to discharge material from the bin, the valve body 18 is rotated to align the passageway 23 with the opening in the sealing gasket to the desired extent to give just the rate of flow from the bin which is desired. Air is then introduced into the plenum chamber 8 underlying the gas-permeable material 7 and also into the plenum chamber 15 underlying the gas-permeable member 14 of the conveyor 3. The air from the plenum chamber 8 passes upwardly through the gas-permeable member 7 and results in a fluidization of the pulverulent material in the feeder section 5. The head of the pulverulent material above the feeder section 2 causes the fluidized material to flow outwardly from that section and through the valve passageway 23 into the valve-control section 6 and on into the upper end of the fluidized or air-activated gravity conveyor 3. As the pulverulent material is introduced onto the upper end of the gas-permeable member 14 of the conveyor 3, its fluidization is maintained by the air passing upwardly through the member 14 with the result that it flows downwardly along the gas-permeable member 14 to the point of final discharge.

Since the gas-permeable member 7 extends under the valve-control section 6, the pulverulent material is maintained in its fluidized state from the time it leaves the feeder section 5 until it reaches the upper end of the conveyor 3. Thus, any possibility of the pulverulent material becoming de-aerated and plugging or partially plugging the passageway 23 of the valve body 18 or any portion of the valve-control section 6 is avoided.

The portion of the gas-permeable material 7 which is covered by the bottom of the partition 4 and the sealing gasket is so negligible that it does not interfere with the maintenance of proper fluidization of the pulverulent material immediately above it, since there will be sufficient flow of air from the opposite sides of the partition into the pulverulent material in the opening immediately thereabove.

The form of the invention shown in Figs. 5, 6 and 7 is the same as that disclosed in Figs. 1 to 4 except that a rotary spherical valve is used in place of the rotary cylindrical valve shown in the earlier figures, and that the partition separating the feeder section from the valve-control section is provided with a circular instead of an elongated opening, and is surrounded by a circular sealing gasket. In these figures reference character 1' designates the discharge outlet from the bin or other container for the pulverulent material, 2' the combined feeder and valve-control unit, 3' the air-activated gravity conveyor by which the material is transported from the bin (4' the partition between the feeder section 5' and the valve-control section 6'), 7' the gas-permeable medium which forms the bottom of the unit 2', 8' the plenum chamber, 9' the partition dividing the plenum chamber into two sections, one beneath each of the feeder section 5' and the valve-control section 6', 11' the air manifold, and 12' and 13' the valve-control pipes through which air from the air-manifold 11' is introduced into the plenum chamber 8', 14' the gas-permeable medium of the air-activated gravity conveyor 3', 15' the plenum chamber underlying the gas-permeable medium, and 16' the pipe by which air is introduced into the plenum chamber 15', all corresponding to the like parts of the apparatus disclosed in Figs. 1 to 4.

In this form of the invention the partition 4' is not offset at its lower end, as is the partition 4, and is provided with a circular opening 17' opposite which is positioned a spherical rotary valve 6'. The sealing gasket 19' in this form of the invention is also circular and is secured around the periphery of the opening 17' and has its inner edge flared rearwardly to present a more extended surface for frictionally engaging the surface of the spherical rotor body 18' which protrudes through the opening 17'.

The spherical rotor body 18' has stub shafts 21' extending from opposite sides thereof which are mounted in bearings 22' secured to the sides of the unit 2'. One of the stub shafts extends through its bearing and has a handle 24' mounted thereon which, like the corresponding handle in Fig. 2, may be manually actuated or connected to suitable mechanism for actuation by remote control.

The spherical valve body is provided with an opening forming a passageway 23' which, like the passageway 23 in the valve rotor body 18, preferably is of sector shape and extends inwardly from the periphery of the spherical body.

As in the preceding form of the invention, the sealing gasket 19' is forced against the periphery of the spherical rotor body 18' and prevents passage of particles of material between it and the spherical rotor body except through the passageway 23'.

The operation of this form of the invention is the same as that described above in connection with the form of the invention shown in Figs. 1 to 4.

Various changes may be made in the details of construction without departing from the spirit of the invention or sacrificing any of the advantages thereof.

I claim:

1. Apparatus for regulating the feed of pulverulent material from a bin or container to a desired place comprising a combined feeder and material-flow regulating unit to be interposed between a bin or container and a conveyor, said unit including a fluidizing and feeding section adapted to receive material from a bin or container and a valve-control or regulating section for receiving material from the fluidizing and feeding section, a partition separating said sections having an opening for the passage of material from the fluidizing and feeder section of the valve-control or regulating section, a rotary valve in said valve-control or regulating section opposite the opening in said partition and sufficiently close thereto to control the flow of fluidized material therethrough, a gas-permeable member forming at least a major portion of the bottom of each of said fluidizing and feeding and valve-control or regulating sections, and a plenum chamber extending beneath said gas-permeable members into which air may be introduced for passage upwardly through the gas-permeable member for fluidizing pulverulent material in said sections, whereby pulverulent material in said sections may be maintained in a fluidized state, said valve, when in open position, having an exposed passageway, elongated in the direction of flow therethrough, extending inwardly from its lower side, said exposed passageway being positioned above the gas-permeable member of the bottom portion of the valve control or regulating section, whereby material during its passage through said passageway is maintained in a fluidized state by air passing upwardly through the gas-permeable member of said valve control or regulating section and into said passageway, and the formation of de-fluidized slugs of material, as the material passes through the valve, is avoided.

2. Apparatus as defined in claim 1 in which the rotary valve is cylindrical and the passageway extending therethrough is generally sector-shaped and has the sides thereof converging inwardly.

3. Apparatus as defined in claim 1 in which the rotary valve is spherical and the passageway extending therethrough is generally sector-shaped and has the sides thereof converging inwardly.

4. Apparatus as defined in claim 1 which includes a resilient sealing member extending around the periphery of the opening in the confining wall and bearing against the rotary valve.

5. Apparatus of the character described comprising a feeder compartment for pulverulent material, a confining wall of said feeder compartment having an opening through which pulverulent material in said compartment may pass, a pulverulent-material conveying surface extending from the side of said confining wall remote from said compartment, a rotary valve opposite the opening in said confining wall and sufficiently close thereto to control the flow of fluidized material therethrough, a gas-permeable member forming at least the major portion of the bottom of said feeder compartment, said material-conveying surface including a gas-permeable member forming the major portion thereof, a plenum chamber under the gas-permeable bottom of said feeder compartment into which a gas may be introduced for passage upwardly through the gas-permeable bottom of the feeder compartment to fluidize pulverulent material thereon, a plenum chamber under said gas-permeable conveying surface member into which a gas may be introduced for passage upwardly through the gas-permeable conveying surface member to fluidize pulverulent material thereon and to cause it to flow along said surface, said valve, when in open position, having an exposed passageway, elongated in the direction of flow therethrough extending inwardly from its lower side, said exposed passageway being positioned above one of said gas-permeable members, whereby material during its passage through said passageway is maintained in a fluidized state by gas passing upwardly through the gas-permeable member and into said passageway, and the formation of de-fluidized slugs of material, as the material passes through the valve, is avoided.

6. Apparatus as defined in claim 5 which includes a resilient sealing member extending around the periphery of the opening in the confining wall and bearing against the rotary valve.

References Cited in the file of this patent

UNITED STATES PATENTS

| | | |
|---|---|---|
| 1,388,673 | Trainer | Aug. 23, 1921 |
| 2,527,455 | Schemm | Oct. 24, 1950 |
| 2,589,968 | Schemm | Mar. 18, 1952 |
| 2,657,100 | Weller | Oct. 27, 1953 |

UNITED STATES PATENT OFFICE

CERTIFICATE OF CORRECTION

Patent No. 2,802,698 August 13, 1957

Werner Krauss

It is hereby certified that error appears in the printed specification of the above numbered patent requiring correction and that the said Letters Patent should read as corrected below.

Column 2, line 19, for "station" read -- section --; column 6, line 25, for "of" read -- to --.

Signed and sealed this 15th day of October 1957.

(SEAL)

Attest:

KARL H. AXLINE

Attesting Officer

ROBERT C. WATSON

Commissioner of Patents